Patented Sept. 16, 1941

2,255,817

UNITED STATES PATENT OFFICE 2,255,817

ELECTROLYTE FOR ELECTROLYTIC CONDENSERS

Samuel Ruben, New Rochelle, N. Y.

No Drawing. Application July 8, 1939, Serial No. 283,453

9 Claims. (Cl. 175—315)

This invention relates to electrolytes for electrolytic condeners of the dry electrolytic type.

The application is a continuation in part of my copending applications Serial No. 10,288, filed March 9, 1935 for Electrolytic condenser, now Patent No. 2,166,180, and Serial No. 11,076, filed March 14, 1935 for Film maintaining electrolyte, now Patent No. 2,166,179.

The above mentioned applications describe electrolytic condensers in which the electrolytes comprise conductive film-forming shellac or rosin compositions. For a more detailed description of the electrolytes and their uses, reference may be had to said applications and to the patents about to issue thereon.

The present invention is distinguished from my prior two inventions by the use of a conductive film-forming hydrogenated tree resin electrolyte. The partial or complete substitution of the hydrogenated tree resin for the rosin or shellac provides an electrolyte which is more resistant to heat and to oxidation and is more stable than the electrolytes of my prior appplications. In addition the improved hydrogenated tree resin electrolyte possesses a high degree of fluidity, which property facilitates the impregnation of wound condenser sections.

The electrolytes may be made by several formulas as follows:

(a) 28 grams of sodium hydroxide are dissolved in 800 c. c. of boiling water; 200 grams of hydrogenated rosin are added and the mixture held at boiling until all of the hydrogenated rosin is dissolved; 90 c. c. of ethylene glycol are added and the temperature raised to 120° C. at which point 100 grams of borax are added and dissolved into the boiling composition to form the complete electrolyte.

(b) 23 grams of sodium hydroxide are dissolved in 500 c. c. of boiling water; 200 grams of hydrogenated rosin are added, the solution being kept at boiling and when the hydrogenated rosin is dissolved, 40 c. c. of ethylene glycol are added and the composition heated to 120° C.

(c) 200 grams of hydrogenated rosin and 500 c. c. of water are heated to boiling at which point 50 c. c. of ammonia (28% solution) are slowly added, the mixture being kept at the boiling point. 100 c. c. of ethylene glycol are added and the composition heated to 120° C.

(d) 28 grams of sodium hydroxide are dissolved in 800 c. c. of boiling water; 100 grams of hydrogenater rosin and 100 grams of shellac are added and the mixture held at boiling until the shellac and hydrogenated rosin are dissolved; 90 c. c. of ethylene glycol are added and the temperature raised to 120° C. at which point 100 grams of borax are added and dissolved into the boiling composition to form the complete electrolyte.

While it is possible to react the constituents of the electrolyte without water I prefer to first form the aqueous solution as set forth and thereafter drive off the water by heating. No free water is present in the completed electrolyte.

In the above formulas, I have found that potassium hydroxide can be satisfactorily substituted for the sodium hydroxide and that the carbonates of potassium and sodium may be substituted for the hydroxide, although not as satisfactorily, as a longer time is required for the reaction and a considerable amount of carbon dioxide is evolved.

Ethylene glycol is the preferred plasticizer in the above formulas, although glycerine or triethenolamine may also be used, separately or in combination with the glycol. Where the hydrogenated rosin is first reacted with the sodium hydroxide or other alkali, glycol or glycerol borate may be use das a plasticizer.

Triethanolamine, being somewhat alkaline, may, for electrolytes of certain types, serve the combined function of an alkaline neutralizer for the acidic resin and plasticizer. In such cases the electrolyte would be composed merely of the resin and triethenolamine reacted together.

Dependent upon the temperature to which the electrolyte mixture is brought during its preparation, the resistance per $cm.^3$ may be varied over wide limits, as from 1500 ohms to 50,000 ohms, the particular service to which the condenser is to be applied being perhaps the most determining factor. Under conditions where a high operating temperature is to be encountered a high initial resistance is desirable. This high initial resistance as well as the power factor, drops as the condenser reaches ts equilibrium operating temperature. When lower operating temperatures are to be encountered, initially low resistance electrolytes may be used with improved condenser power factor.

When properly prepared, the electrolyte is very viscous, plastic, varnish-like material and remains indefinitely in this condition, even though exposed to the atmosphere. Its consistency may be varied, of course, depending upon the proportions of ingredients and method of preparation particularly with respect to the temperature to which the composition is heated during its preparation. The electrolyte may be made in the form of a viscous liquid, which will slowly drip, or it may be made sufficiently immobile so that it will adhere to the electrodes without dripping or flowing. Preferably it may resemble a non-drying applied varnish. The immobility of the electrolyte serves to minimize the effect of any impurities which may be present in the resins. The electrolyte is preferably applied hot in the form of a tacky, electrically conductive film maining composition, which sticks to the current blocking film and tends to protect and maintain the film.

If desired the fluidity of the electrolyte may be increased by the addition of glycol or other suitable material; or it may be decreased by reducing the amount of glycol.

What is claimed is:

1. An electrolyte for electrolytic condensers, comprising the reaction product of hydrogenated rosin, an alkali and a plasticizer.

2. An electrolyte for electrolytic condensers comprising the reaction product of hydrogenated rosin, an alkali selected from the group consisting of sodium, potassium and sodium hydroxide and an alcohol of the glycol type.

3. An electrolyte for electrolytic condensers comprising an alkali reacted hydrogenated rosin composition and a plasticizer therefor.

4. An electrolyte for electrolytic condensers comprising the reaction product of hydrogenated rosin, shellac, an alkali and a plasticizer.

5. An electrolyte for electrolytic condensers comprising the reaction product of hydrogenated rosin, an alkali and glycol.

6. An oxide film maintaining electrolyte comprising the reaction product of hydrogenated rosin, shellac, sodium borate and ethylene glycol.

7. An oxide film maintaining electrolyte comprising the reaction product of hydrogenated rosin, a borate and a plasticizer.

8. An oxide film-maintaining electrolyte for electrolytic condensers comprising the reaction product of hydrogenated tree resin with an alkaline neutralizer for the acidic constituents of said resin and a plasticizer therefor.

9. An oxide film-maintaining electrolyte for electrolytic condensers comprising the reaction product of hydrogenated rosin with an alkaline neutralizer for the acidic constituents of said resin and a plasticizer therefor.

SAMUEL RUBEN.